United States Patent
Lu et al.

(10) Patent No.: US 10,162,834 B2
(45) Date of Patent: Dec. 25, 2018

(54) FINE-GRAINED METADATA MANAGEMENT IN A DISTRIBUTED FILE SYSTEM

(71) Applicant: VMware, Inc., Palo Alto, CA (US)

(72) Inventors: Luke Lu, San Jose, CA (US); Wenguang Wang, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 337 days.

(21) Appl. No.: 15/011,300

(22) Filed: Jan. 29, 2016

(65) Prior Publication Data

US 2017/0220598 A1 Aug. 3, 2017

(51) Int. Cl.
G06F 17/30 (2006.01)
H04L 29/08 (2006.01)

(52) U.S. Cl.
CPC .... *G06F 17/30194* (2013.01); *G06F 17/3012* (2013.01); *G06F 17/30138* (2013.01); *H04L 67/10* (2013.01); *H04L 67/1017* (2013.01); *H04L 67/1097* (2013.01)

(58) Field of Classification Search
CPC ........... G06F 17/30194; G06F 17/3012; G06F 17/30138; G06F 17/30; G06F 17/30091; G06F 17/1097; G06F 17/30578; G06F 17/30174; G06F 17/30212; G06F 12/0284; G06F 17/30067; G06F 17/30171; G06F 17/5045; G06F 17/30569; H04L 67/1011; H04L 67/1097; H04L 67/10
See application file for complete search history.

(56) References Cited

U.S. PATENT DOCUMENTS

| | | | |
|---|---|---|---|
| 2003/0126200 A1* | 7/2003 | Wolff | G06F 9/52 709/203 |
| 2004/0153479 A1* | 8/2004 | Mikesell | G06F 11/1096 707/E17.01 |
| 2006/0117056 A1* | 6/2006 | Havewala | G06F 17/30067 707/E17.01 |
| 2007/0022129 A1* | 1/2007 | Bahar | G06F 9/5011 707/E17.01 |
| 2009/0006468 A1* | 1/2009 | Shankar | G06F 17/30091 707/E17.045 |
| 2011/0145307 A1* | 6/2011 | Ananthanarayanan | G06F 17/30132 707/827 |
| 2014/0019405 A1* | 1/2014 | Borthakur | G06F 17/30194 707/E17.005 |
| 2015/0277969 A1* | 10/2015 | Strauss | G06F 9/466 707/703 |
| 2015/0280959 A1* | 10/2015 | Vincent | H04L 67/1097 709/203 |
| 2016/0019233 A1* | 1/2016 | Wijayaratne | G06F 17/30174 707/625 |

(Continued)

*Primary Examiner* — Anh Ly

(57) ABSTRACT

Techniques for performing fine-grained metadata management in a distributed file system (DFS) are provided. In one embodiment, each node in a plurality of nodes implementing the DFS can execute a namespace metadata service that is dedicated to managing file system metadata pertaining to one or more namespaces of the DFS. Each node can further execute a data metadata service that is distinct from the namespace metadata service, where the data metadata service is dedicated to managing file system metadata pertaining to properties of data and free space in the DFS.

15 Claims, 4 Drawing Sheets

(56) References Cited

U.S. PATENT DOCUMENTS

2016/0072889 A1\* 3/2016 Jung .................. H04L 67/1097
709/219

\* cited by examiner

FINE-GRAINED METADATA MANAGEMENT IN A DISTRIBUTED FILE SYSTEM

BACKGROUND

A distributed file system (DFS) is a type of file system in which file system resources (i.e., data and metadata) are stored on one or more networked storage devices. A DFS allows these networked storage devices, which collectively represent a distributed storage layer, to be simultaneously accessed by multiple client nodes in a manner that is similar, or identical, to local storage devices. In this way, the file system resources can be transparently shared across the client nodes. Examples of commercially available DFSs include GFS, HDFS, Ceph, and the like.

Generally speaking, existing DFSs can be classified as being symmetric or asymmetric. In a symmetric DFS, all data and metadata are managed by the same file system service(s) (running on either the client nodes or storage server nodes). Stated another way, all data (e.g., I/O) and metadata (e.g., namespace-related) requests are handled using a singular code path that makes use of the same set of compute resources.

In an asymmetric DFS, data and metadata are managed by separate file system services. For example, there may be one or more dedicated metadata managers that are specifically configured to maintain the structural elements of the file system, and all metadata requests are routed to these dedicated metadata managers. Data requests are handled via a different and separate code path (which may run on a separate machine, or on the same machine as the metadata manager(s) but with its own distinct set of compute resources).

One advantage of the asymmetric approach is that, in some cases, the volume of data requests generated by storage clients in a DFS deployment may be significantly greater or less than the volume of metadata requests. For instance, consider a scenario where storage clients perform a large number of reads from existing files, but do not need to create or modify files often. In this scenario, with an asymmetric DFS, the data services can be scaled independently of the metadata services in order to accommodate the heavy load of data read requests. With a symmetric DFS, the compute resources allocated to the combined data/metadata services would need to be scaled in tandem even though the metadata management load is relatively light, resulting in less flexibility and potentially inefficient use of system resources.

However, even with the asymmetric DFS design, there are use cases where the scalability and efficiency of file system services is not ideal. For example, there may be situations where different types of file system metadata are created/accessed at different rates, and/or where storage clients migrate between different physical machines. For these and other similar situations, a more flexible approach for handling file system metadata is desirable.

DETAILED DESCRIPTION

Figure 1:
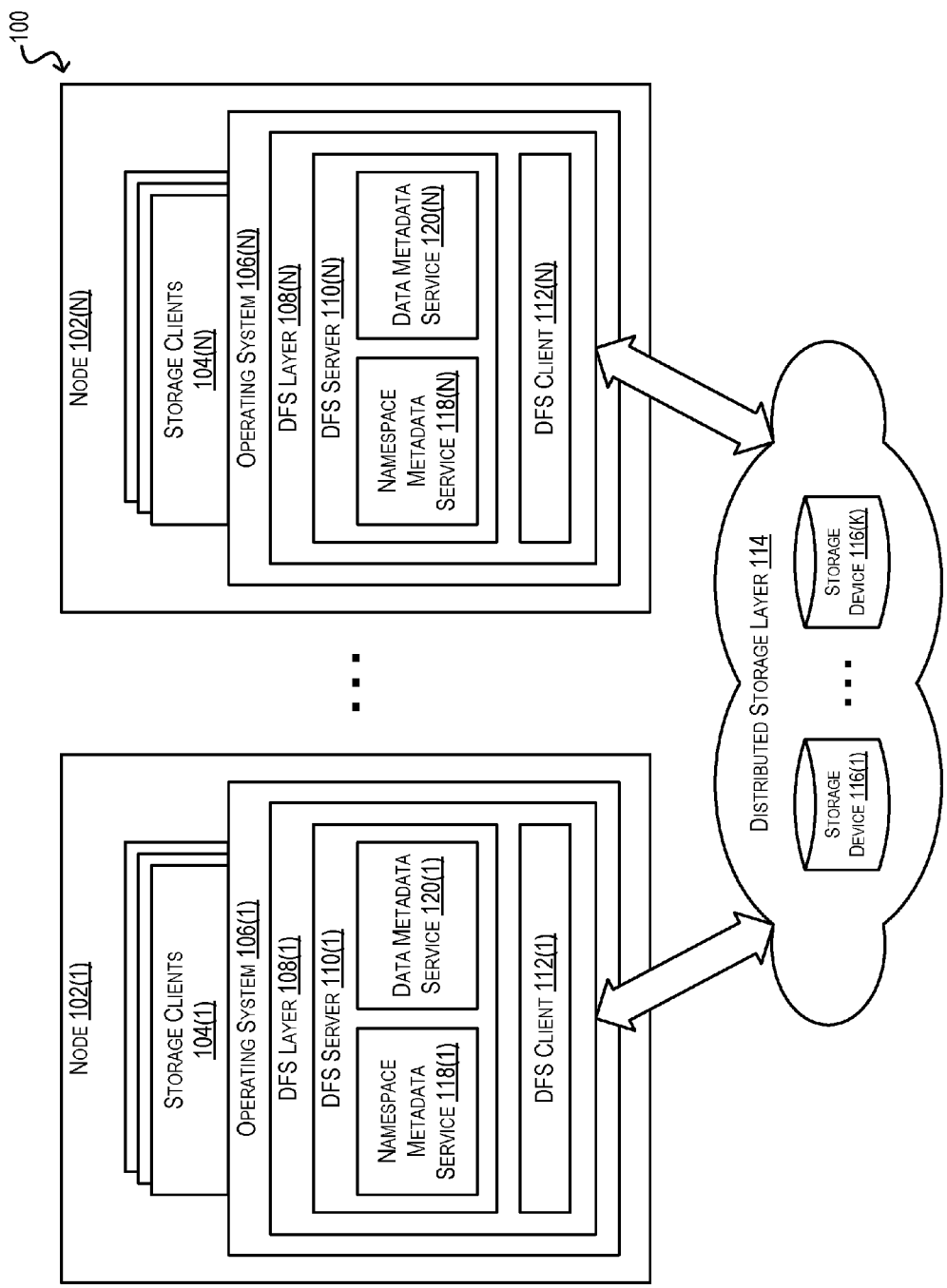
FIG. 1 depicts a system architecture for enabling fine-grained metadata management in a DFS according to an embodiment.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

I. Overview

Embodiments of the present disclosure provide techniques that enable more fine-grained metadata management in a distributed file system (DFS). In one set of embodiments, each node running an instance of the DFS can execute two different types of file system metadata services—a namespace metadata service and a data metadata service. The namespace metadata service can be dedicated to managing metadata pertaining to the namespace(s) of the DFS, which can include file system tree information, file names, extended attributes (i.e., attributes on files and directories), directory information, volume information, snapshots, clones, access control lists (ACLs), and other structures used to update this information (e.g., logical and physical logs). The data metadata service can be dedicated to managing metadata pertaining to the properties of data and free space in the DFS, which includes free space information, reference counts of data, checksums of data, block allocations, and other structures used update this information (e.g., logical and physical logs).

With this division of metadata services into namespace metadata services and data metadata services, each type of metadata service can be scaled independently of the other (i.e., the namespace metadata service layer can be scaled independently of the data metadata service layer and vice versa) on an as-needed basis. This results in more fine-grained scalability than asymmetric file system designs that rely on a monolithic metadata service layer. For example, consider a DFS deployment where files or volumes are created frequently, but once created they are not modified often. In this case, since the number of namespace metadata operations (for file/volume creation) will significantly outpace the number of data metadata operations (which are typically needed only when files are updated), the compute resources allocated to the namespace metadata service layer can be increased while the compute resources allocated to the data metadata layer can be kept constant (or reduced).

As another example, consider a converse situation where only a few files and/or volumes are created, but the files are modified on an ongoing basis (resulting in, e.g., fragmentation and changes in free space on disk). In this case, since the number of data metadata operations will significantly outpace the number namespace metadata operations, the compute resources allocated to the data metadata service layer can be increased while the compute resources allocated to the namespace metadata layer can be kept constant (or reduced).

In additional to more granular scalability, the division of metadata services into namespace metadata services and data metadata services can also provide better metadata service locality for storage clients (e.g., virtual machines (VMs) or containers) that are capable of dynamically moving between nodes in a deployment. This, in turn, can result in improved I/O performance. For instance, consider a cluster of host system nodes that each run one or more VMs. Assume the VMs on each host system require access to the same file system namespace; however, the VMs on host A may only read/write a subset S1 of files in the namespace, the VMs on host B may only read/write a subset S2 of files in the namespace, and so on. In this scenario, the data metadata service running on each host system may be configured such that it only handles the data metadata objects accessed by local VMs (e.g., objects for file subset S1 on host A, objects for file subset S2 on host B, etc.). This ensures that data metadata requests originating from one host system node will not need to be directed to another host system node for handling. Similar locality principles can be applied to the namespace metadata services.

These and other aspects of the present disclosure are described in further detail in the sections that follow.

II. System Architecture

FIG. 1 depicts a DFS deployment 100 in which embodiments of the present disclosure may be implemented. As shown, deployment 100 includes a number of nodes (e.g., host systems) 102(1)-(N), each of which is configured to run one or more storage clients 104 and an operating system 106. In a particular embodiment, storage clients 104 can be VMs and operating system 106 can be a hypervisor, such as VMware Inc.'s ESX hypervisor. Each operating system 106, in turn, includes a distributed file system (DFS) layer 108 comprising a logical DFS server 110 and an internal DFS client 112. DFS servers 110 and DFS clients 112 work in concert to enable storage clients 104 to access file system data and metadata objects persisted on a distributed storage layer 114 (comprising networked storage devices 116(1)-(K)).

For example, a given DFS client 112(X) can intercept a data (i.e., I/O) or metadata request originating from a local storage client 104(X) and can determine, using a directory service, which DFS server 110 (and more particularly, which file system service within the server) is configured to manage the storage objects corresponding to the request. DFS client 112(X) can then forward the request to the appropriate DFS server/service, which can carry out the task of processing the request against distributed storage layer 114 and returning an appropriate response to storage client 104(X).

As noted in the Background Section, existing DFSs generally implement a symmetric or asymmetric approach for managing file system data and metadata. With the symmetric approach, all data and metadata requests are handled by the same file system service (e.g. code path) on each node. On the other hand, with the asymmetric approach, data requests are handled by a data service and metadata services are handled by a separate metadata service. The asymmetric approach is typically preferred over the symmetric approach due to its ability to scale compute resources for the data and metadata services independently. However, in many cases, the asymmetric approach is still not granular enough to accommodate certain use cases.

To address this, DFS deployment 100 of FIG. 1 implements a novel arrangement in which each node 102(1)-(N) maintains (within its respective DFS server 110) two different types of metadata services—a namespace metadata service 118 and a data metadata service 120. As mentioned previously, each namespace metadata service 118 is configured to manage one or more metadata objects (stored on distributed storage layer 114) that pertain to the namespace (s) of the DFS, such as file system tree information, file names, extended attributes, directory information, volume information, snapshots, clones, access control lists (ACLs), etc. Each data metadata service 120 is configured to manage one or more metadata objects (stored on distributed storage layer 114) that pertain to the properties of data and free space in the DFS, such as free space information, reference counts of data, checksums of data, block allocations, etc. Thus, the arrangement shown in FIG. 1 effectively bifurcates file system metadata management and request handling into two separate code paths on each node, based on the type of metadata being managed/handled (e.g., namespace metadata or data metadata).

As described in further detail below, with this arrangement, the namespace metadata and data metadata layers can be scaled independently based on the request load for each type of metadata received from storage clients 104. This scaling can involve increasing the amount of compute resources (e.g., threads or fibers) allocated to one or more services 118/120, or load balancing objects/requests across service instances. In addition, in certain embodiments, the mappings between metadata objects and services 118/120 can be dynamically modified to improve metadata service locality based on which storage clients are accessing which objects. Accordingly, these techniques can provide better flexibility, scalability, and performance than existing symmetric and asymmetric DFS implementations.

It should be appreciated that FIG. 1 is illustrative and not intended to limit the embodiments described herein. For example, in alternative embodiments, each node 102(1)-(N) may not necessarily include both a namespace metadata service 118 and a data metadata service 120; rather, instances of these services may be instantiated on demand on each node based on the load of the system. Further, DFS deployment 100 may include other components and subcomponents that are not specifically described. One of ordinary skill in the art will recognize many variations, modifications, and alternatives.

III. Scaling Workflows

Figure 2:
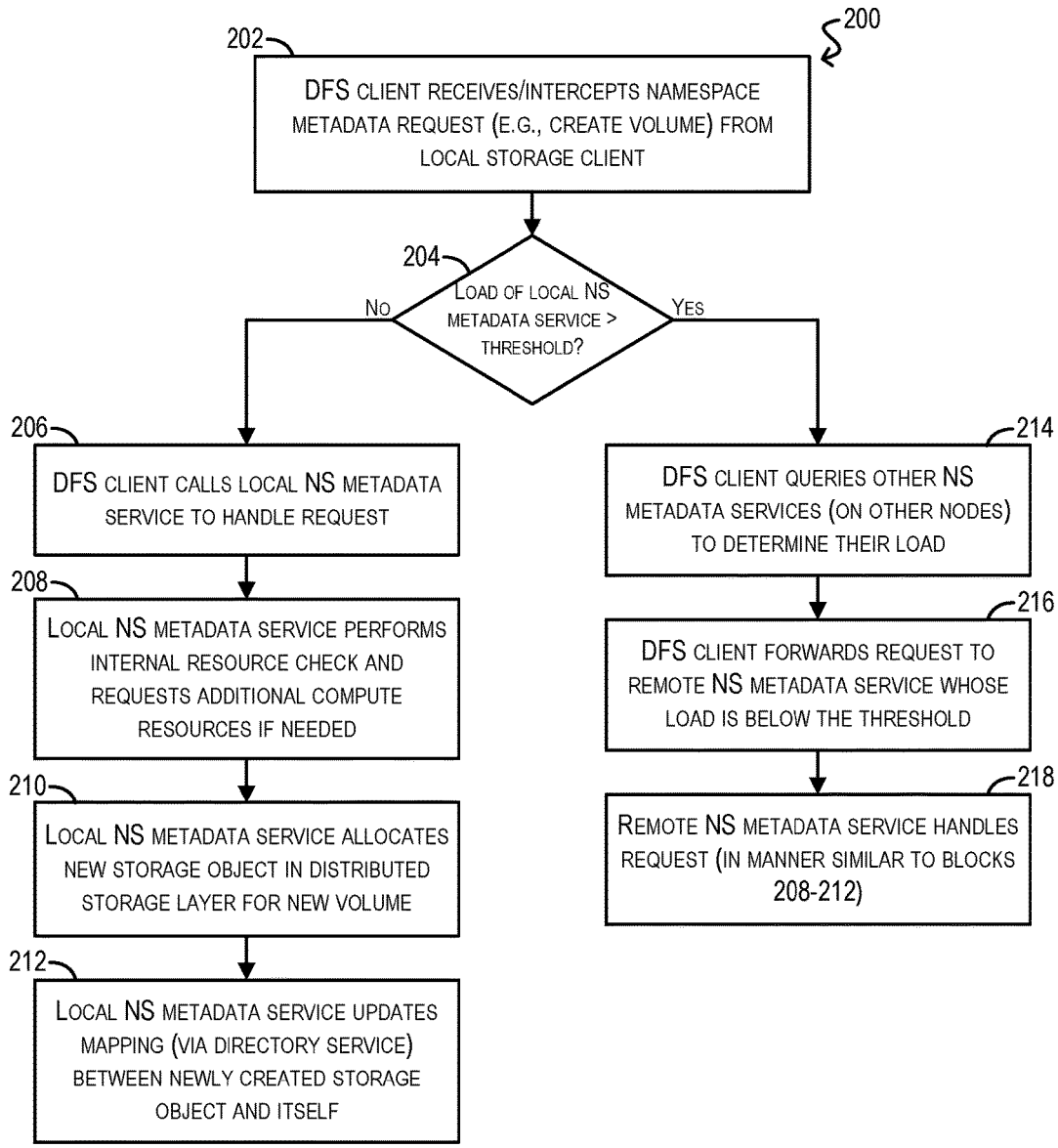
FIG. 2 depicts a workflow for scaling namespace metadata services independently of data metadata services according to an embodiment.

FIG. 2 depicts an example workflow 200 that may be performed by DFS layer 108(X) of a particular node 102(X) in FIG. 1 for scaling the namespace metadata service layer in response to a request to create/modify namespace metadata according to an embodiment.

At block 202, DFS client 112(X) can receive/intercept a namespace metadata request (e.g., a "create volume" request) from a local storage client 104(X). In response, DFS client 112(X) can check whether the current load of local namespace metadata service 118(X) is greater than a predefined load threshold (block 204).

If not, DFS client 112(X) can call namespace metadata service 118(X) to handle the create volume request (block 206). As part of this handling, namespace metadata service 118(X) can perform an internal check to determine whether the processing of the request will cause the service to require additional compute resources and if so, can request the allocation of such additional resources (e.g., an additional thread or fiber) from operating system 106(X) (block 208). In addition, namespace metadata service 118(X) can create/allocate a new storage object on distributed storage layer 114 in order to hold the namespace metadata for the new volume (block 210), and can update the directory service mentioned previously to store a mapping between the service and the newly created storage object (block 212).

On the other hand, if DFS client 112(X) determines at block 204 that the current load of namespace metadata service 118(X) exceeds the predefined load threshold, DFS client 112(X) can attempt to offload the handling of the create volume request to another namespace metadata service on another node. For example, at block 214, DFS client 112(X) can query the other namespace metadata services 118(1)-(N) (according to some order, such as round robin) in order to determine their current load.

Upon identifying a particular namespace metadata service 118(Y) whose current load is below the load threshold, DFS client 112(X) can forward the create volume request to that identified service (block 216). Namespace metadata service 118(Y) can then handle the request in a manner similar to blocks 208-212 (block 218).

Figure 3:
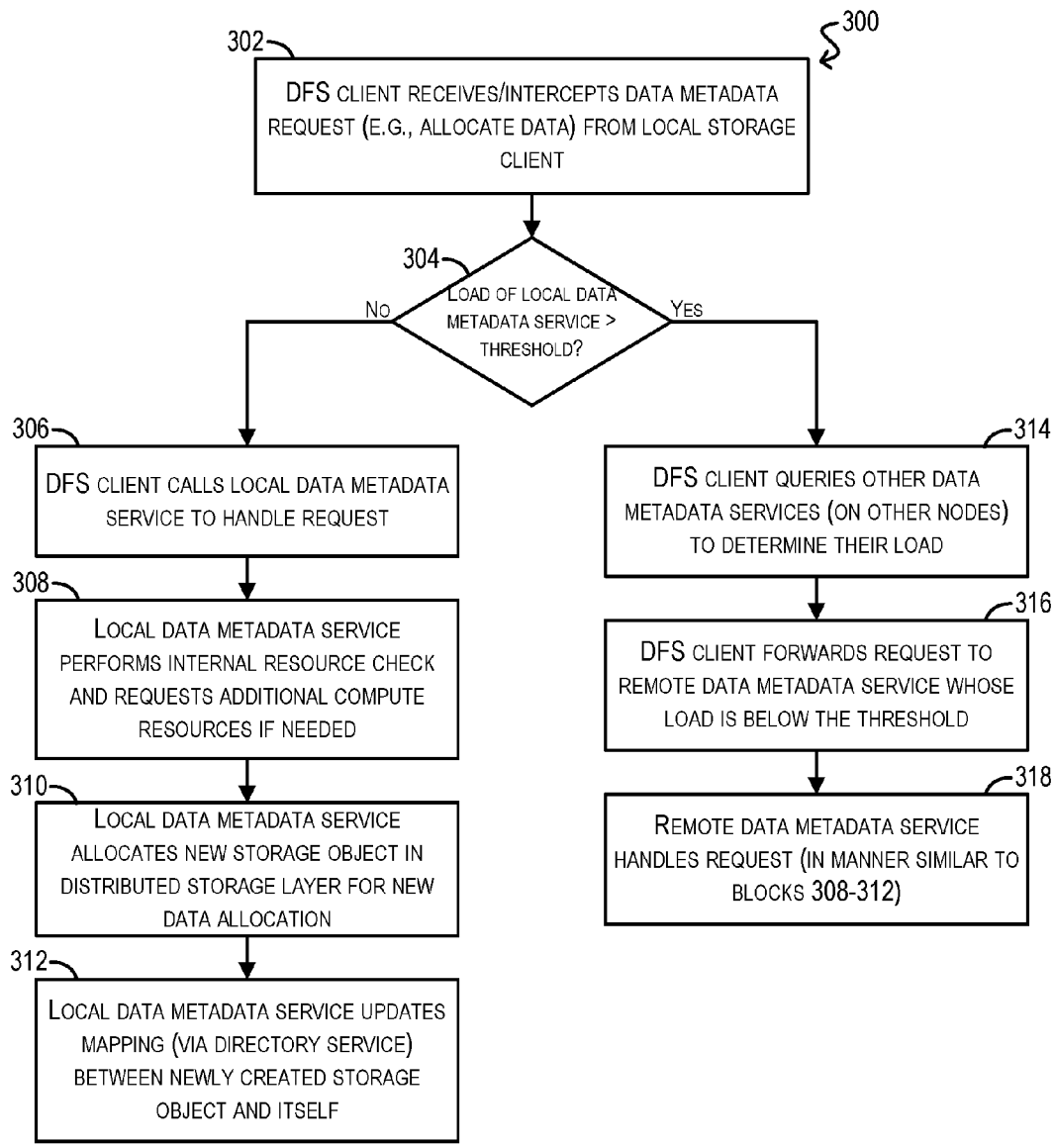
FIG. 3 depicts a workflow for scaling data metadata services independently of namespace metadata services according to an embodiment.

FIG. 3 depicts an example workflow 300 that may be performed by DFS layer 108(X) of a particular node 102(X) in FIG. 1 for scaling the data metadata service layer in response to a request to create/modify data metadata according to an embodiment.

At block 302, DFS client 112(X) can receive/intercept a data metadata request (e.g., an "allocate data" request) from a local storage client 104(X). In response, DFS client 112(X) can check whether the current load of local data metadata service 120(X) is greater than a predefined load threshold (block 304). This load threshold for the data metadata service may be the same as, or different from, the load threshold for the namespace metadata service described with respect to FIG. 2.

If not, DFS client 112(X) can call data metadata service 120(X) to handle the allocate data request (block 306). As part of this handling, data metadata service 120(X) can perform an internal check to determine whether the processing of the request will cause the service to require additional compute resources, and if so, can request the allocation of such additional resources (e.g., an additional thread or fiber) from operating system 106(X) (block 308). In addition, data metadata service 120(X) can create/allocate a new storage object on distributed storage layer 114 in order to hold the data metadata for the new data allocation (block 310), and can update the directory service mentioned previously to store a mapping between the service and the newly created storage object (block 312).

On the other hand, if DFS client 112(X) determines at block 304 that the current load of data metadata service 120(X) exceeds the predefined load threshold, DFS client 112(X) can attempt to offload the handling of the allocate data request to another data metadata service on another node. For example, at block 314, DFS client 112(X) can query the other data metadata services 120(1)-(N) (according to some order, such as round robin) in order to determine their current load.

Upon identifying a particular data metadata service 120(Y) whose current load is below the load threshold, DFS client 112(X) can send the allocate data request to that identified service (block 316). Data metadata service 120(Y) can then handle the request in a manner similar to blocks 308-312 (block 318).

As can be seen from workflows 200 and 300, the scaling (i.e., increased allocation or load balancing of compute resources) of namespace metadata services 118(1)-(N) and data metadata services 120(1)-(N) can occur separately and independently of each other, as dictated by the load on each type of metadata service. This advantageously increases the granularity at which the DFS can react to changing workloads, and thereby increases overall performance and efficiency.

It should be appreciated that workflows 200 and 300 are merely presented as examples, and various modifications to these workflows are possible. For instance, certain functions attributed to DFS client 112(X) may instead be performed by namespace metadata service 118(X) or data metadata service 120(X) and vice versa. Further, the order of steps shown in these workflows may rearranged, and certain steps may be omitted or added depending on the context. One of ordinary skill in the art will recognize other variations, modifications, and alternatives.

IV. Locality Workflow

Figure 4:
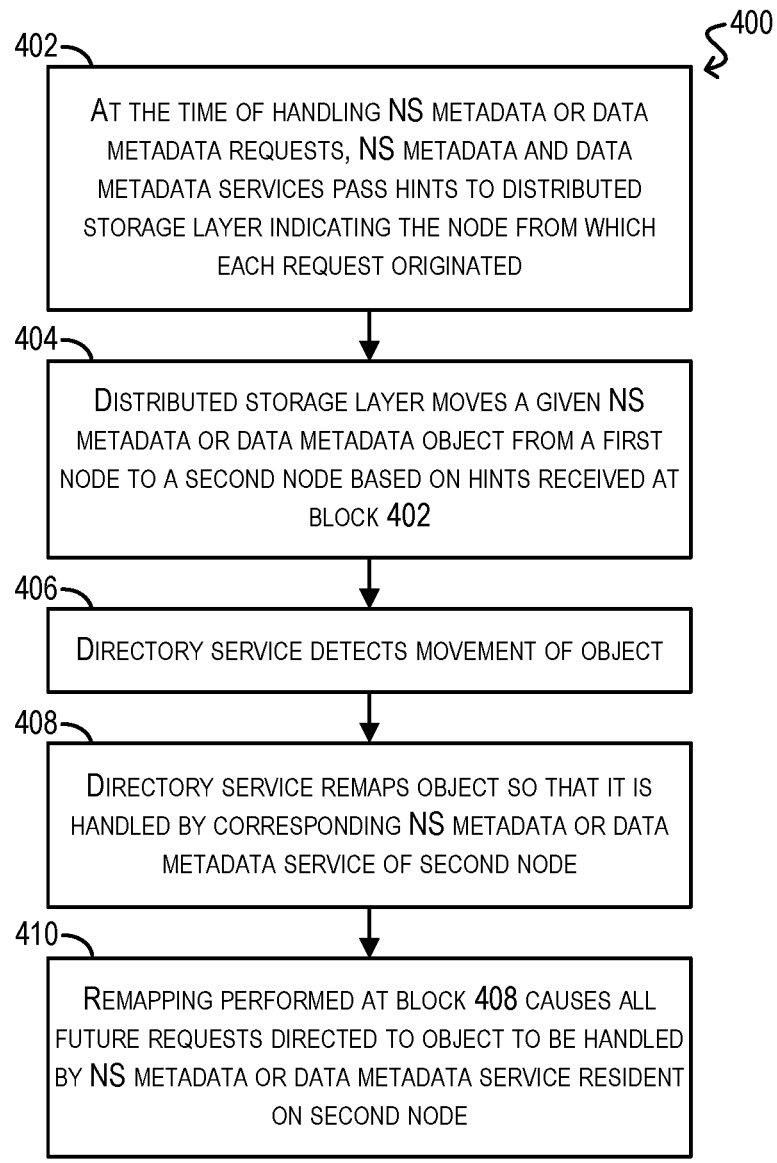
FIG. 4 depicts a workflow for improving metadata service locality according to an embodiment.

As mentioned previously, in addition to allowing independent scaling of namespace metadata and data metadata services, certain embodiments of the present disclosure can also dynamically remap namespace metadata and data metadata services to metadata storage objects in order to improve locality of service for storage clients. FIG. 4 depicts a workflow 400 that illustrates this feature according to an embodiment. Workflow 400 can operate asynchronously from the I/O request flow between storage clients 104 and DFS layer 108.

Starting with block 402, at the time of handling namespace metadata or data metadata requests, namespace metadata services 118(1)-(N) and data metadata services 120(1)-(N) can pass hints to distributed storage layer 114 indicating the node from which each request originated. For example, if a particular request originated from a storage client on node 102(2), service 118 or 120 can pass a hint to layer 114 identifying node 102(2) as the originating node.

At block 404, distributed storage layer 114 can carry out logic for examining the current locations of storage objects relative to the nodes from which they are most frequently accessed, and can determine that a given namespace metadata object or data metadata object should be moved from a first storage device on a first node to a second storage device on a second node. Note that this assumes that each networked storage device 116 in distributed storage layer 114 is local to one of nodes 102(1)-(N).

At block 406, a directory service of distributed storage layer 114 can detect the movement of the namespace metadata or data metadata object at block 404. In response, the directory service can change the namespace metadata or data metadata service that is designated to handle that storage object (via, e.g., a service-to-object remapping operation). In particular, the directory service can remap the storage object so that it is now handled by the corresponding namespace metadata or data metadata service of the second node (rather than the first node) (block 408).

Finally, at block 410, the remapping performed at block 408 can cause all future requests directed to the storage object to be handled by the namespace metadata or data metadata service resident on the second node, which is closer (i.e., more local) to the majority of storage clients accessing it. This improved service locality results in better I/O performance for those clients.

Certain embodiments described herein involve a hardware abstraction layer on top of a host computer. The hardware abstraction layer allows multiple containers to share the hardware resource. These containers, isolated from each other, have at least a user application running therein. The hardware abstraction layer thus provides benefits of resource isolation and allocation among the containers. In the foregoing embodiments, virtual machines are used as an example for the containers and hypervisors as an example for the hardware abstraction layer. As described above, each virtual machine includes a guest operating system in which at least one application runs. It should be noted that these embodiments may also apply to other examples of containers, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Further, certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for performing metadata management in a distributed file system (DFS), the method comprising:
   executing, on each node of a plurality of nodes implementing the DFS, a namespace metadata service that is dedicated to managing file system metadata pertaining to one or more namespaces of the DFS and a data metadata service distinct from the namespace metadata service, the data metadata service being dedicated to managing file system metadata pertaining to properties of data and free space in the DFS; and
   independently load balancing namespace metadata requests and data metadata requests by:
      receiving, at a first node in the plurality of nodes, a namespace metadata request from a storage client local to the first node;
      determining whether a current processing load of the namespace metadata service executing on the first node exceeds a first predefined load threshold;
      if the current processing load of the namespace metadata service does not exceed the first predefined load threshold, calling the namespace metadata service to handle the namespace metadata request;
      if the current processing load of the namespace metadata service does exceed the first predefined load threshold, forwarding the namespace metadata request to another namespace metadata service executing on another node whose load is below the first predefined load threshold;
      receiving, by the first node, a data metadata request from the storage client;
      determining whether a current processing load of the data metadata service executing on the first node exceeds a second predefined load threshold;
      if the current processing load of the data metadata service does not exceed the second predefined load threshold, calling the data metadata service to handle the data metadata request; and
      if the current processing load of the data metadata service does exceed the second predefined load threshold, forwarding the data metadata request to another data metadata service executing on another node whose processing load is below the second predefined load threshold.

2. The method of claim 1 wherein the file system metadata pertaining to one or more namespaces of the DFS includes file system tree information, file names, extended attributes, directory information, volume information, snapshots, and clones.

3. The method of claim 1 wherein the file system metadata pertaining to properties of data and free space in the DFS includes free space information, reference counts of data, checksums of data, and data block allocations.

4. The method of claim 1 wherein the namespace metadata service and the data metadata service are each mapped to respective metadata storage objects stored on a distributed storage layer, and wherein mappings between each service and the metadata storage objects are modified on a periodic basis to improve service locality for storage clients accessing the metadata storage objects.

5. The method of claim 4 wherein the distributed storage layer comprises a set of storage devices, each of which is locally attached to a node in the plurality of nodes.

6. A non-transitory computer readable storage medium having stored thereon program code executable by a node in a plurality of nodes implementing a distributed file system (DFS), the program code embodying a method for performing metadata management in the DFS, the method comprising:
  executing a namespace metadata service that is dedicated to managing file system metadata pertaining to one or more namespaces of the DFS and a data metadata service distinct from the namespace metadata service, the data metadata service being dedicated to managing file system metadata pertaining to properties of data and free space in the DFS; and
  independently load balancing namespace metadata requests and data metadata requests by:
    receiving a namespace metadata request from a storage client local to the node;
    determining whether a current processing load of the namespace metadata service exceeds a first predefined load threshold;
    if the current processing load of the namespace metadata service does not exceed the first predefined load threshold, calling the namespace metadata service to handle the namespace metadata request;
    if the current processing load of the namespace metadata service does exceed the first predefined load threshold, forwarding the namespace metadata request to another namespace metadata service executing on another node whose load is below the first predefined load threshold;
    receiving a data metadata request from the storage client;
    determining whether a current processing load of the data metadata service exceeds a second predefined load threshold;
    if the current processing load of the data metadata service does not exceed the second predefined load threshold, calling the data metadata service to handle the data metadata request; and
    if the current processing load of the data metadata service does exceed the second predefined load threshold, forwarding the data metadata request to another data metadata service executing on another node whose processing load is below the second predefined load threshold.

7. The non-transitory computer readable storage medium of claim 6 wherein the file system metadata pertaining to one or more namespaces of the DFS includes file system tree information, file names, extended attributes, directory information, volume information, snapshots, and clones.

8. The non-transitory computer readable storage medium of claim 6 wherein the file system metadata pertaining to properties of data and free space in the DFS includes free space information, reference counts of data, checksums of data, and data block allocations.

9. The non-transitory computer readable storage medium of claim 6 wherein the namespace metadata service and the data metadata service are each mapped to respective metadata storage objects stored on a distributed storage layer, and wherein mappings between each service and the metadata storage objects are modified on a periodic basis to improve service locality for storage clients accessing the metadata storage objects.

10. The non-transitory computer readable storage medium of claim 9 wherein the distributed storage layer comprises a set of storage devices, each of which is locally attached to a node in the plurality of nodes.

11. A computer system operating as a node in a plurality of nodes implementing a distributed file system (DFS), the computer system comprising:
  a processor; and
  a non-transitory memory having stored thereon program code for performing metadata management in the DFS, the program code causing the processor to:
    execute a namespace metadata service that is dedicated to managing file system metadata pertaining to one or more namespaces of the DFS and a data metadata service distinct from the namespace metadata service, the data metadata service being dedicated to managing file system metadata pertaining to properties of data and free space in the DFS; and
    independently load balance namespace metadata requests and data metadata requests by:
      receiving a namespace metadata request from a storage client local to the computer system;
      determining whether a current processing load of the namespace metadata service exceeds a first predefined load threshold;
      if the current processing load of the namespace metadata service does not exceed the first predefined load threshold, calling the namespace metadata service to handle the namespace metadata request;
      if the current processing load of the namespace metadata service does exceed the first predefined load threshold, forwarding the namespace metadata request to another namespace metadata service executing on another node whose load is below the first predefined load threshold;
      receiving a data metadata request from the storage client;
      determining whether a current processing load of the data metadata service exceeds a second predefined load threshold;
      if the current processing load of the data metadata service does not exceed the second predefined load threshold, calling the data metadata service to handle the data metadata request; and
      if the current processing load of the data metadata service does exceed the second predefined load threshold, forwarding the data metadata request to another data metadata service executing on another node whose processing load is below the second predefined load threshold.

12. The computer system of claim 11 wherein the file system metadata pertaining to one or more namespaces of the DFS includes file system tree information, file names, extended attributes, directory information, volume information, snapshots, and clones.

13. The computer system of claim 11 wherein the file system metadata pertaining to properties of data and free space in the DFS includes free space information, reference counts of data, checksums of data, and data block allocations.

14. The computer system of claim 11 wherein the namespace metadata service and the data metadata service are each mapped to respective metadata storage objects stored on a distributed storage layer, and wherein mappings between each service and the metadata storage objects are modified on a periodic basis to improve service locality for storage clients accessing the metadata storage objects.

15. The computer system of claim 14 wherein the distributed storage layer comprises a set of storage devices, each of which is locally attached to a node in the plurality of nodes.

* * * * *